(12) United States Patent
Tsai (10) Patent No.: US 11,172,666 B2
(45) Date of Patent: Nov. 16, 2021

(54) FISHING ROD HOLDER

(71) Applicant: Ju-Yi Tsai, New Taipei (TW)

(72) Inventor: Ju-Yi Tsai, New Taipei (TW)

(73) Assignee: Ci-Long Cai, New Taipei (TW)

( * ) Notice: Subject to any disclaimer, the term of this patent is extended or adjusted under 35 U.S.C. 154(b) by 280 days.

(21) Appl. No.: 16/660,505

(22) Filed: Oct. 22, 2019

(65) Prior Publication Data

US 2021/0112802 A1     Apr. 22, 2021

(51) Int. Cl.
*A01K 97/10*     (2006.01)

(52) U.S. Cl.
CPC ..................................... *A01K 97/10* (2013.01)

(58) Field of Classification Search
CPC ................................ A01K 97/10; A01K 97/11
See application file for complete search history.

(56) References Cited

U.S. PATENT DOCUMENTS

| | | | | |
|---|---|---|---|---|
| 3,832,794 | A * | 9/1974 | Encinias | A01K 97/11 43/15 |
| 5,033,223 | A * | 7/1991 | Minter | A01K 97/10 43/21.2 |
| 2005/0229470 | A1* | 10/2005 | King | A01K 97/10 43/21.2 |
| 2018/0020651 | A1* | 1/2018 | Larkin | B63B 25/002 43/21.2 |

* cited by examiner

*Primary Examiner* — Richard G Davis
(74) *Attorney, Agent, or Firm* — Che-Yang Chen; Law Office of Michael Chen (57) ABSTRACT

A fishing rod holder is disclosed. It comprises a fishing rod fixing portion, a fishing rod bracket extension portion, a base portion, a connecting pin and an adjusting screw. The fishing rod holder according to the present invention has many hollow column designs for connection. It is very extensible and can be integrated with other auxiliary equipment to provide more customized combination of fishermen. In addition, the components of the fishing rod holder are detachable and can be assembled and used. It is a design that is not available in many homogenous products.

10 Claims, 6 Drawing Sheets

FISHING ROD HOLDER

FIELD OF THE INVENTION

The present invention relates to a holder. More particularly, the present invention relates to a fishing rod holder which is able to temporarily place fishing tackles and conveniently connected to other fishing peripheral products.

BACKGROUND OF THE INVENTION

Fishing is a very popular leisure activity. When fishmen carry fishing tackles stationed by the river or by the sea, in addition to enjoying the quick accidents of fighting with the fish under the water, the wilderness environment provided by nature will make them forget to return.

The most important tools for fishing are fishing rods and fishing lures, while the former is the most important thing when fishing. Although it is a pleasure to watch the fishing line being pulled up and down by the fish, it makes people feel tired to hold the fishing rod waiting for fish for a long time. Hence, the merchandisers around the fishing peripherals have a series of products to solve this inevitable trouble. One of the oldest and most mature products is the fishing rod holder.

The simplest structure of a fishing rod holder is a bracket that temporarily holds the fishing rod by fixing itself to the ground or other temporary weight. As the material of the fishing rod is lighter, the fishing rod holder is also shorter and more multifunctional. However, general fishing rod holder has two disadvantages: first, the extension is not enough, which is difficult to connect with other auxiliary equipment, further providing more customized combination of the fishermen; secondly, they are unable to disassemble and not portable.

Therefore, in order to improve the problems of the fishing rod holders above, making the fishing activity more convenient, a new form of the fishing rod holder of the present invention is proposed.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

A fishing rod holder is disclosed by the present invention. It comprises: a fishing rod fixing portion, comprising: a, hollow short cylindrical body, the interior of the hollow short cylindrical body is for inserting a grip of a fishing rod; a first pin connecting structure, formed below a first opening side of the hollow short cylindrical body; a fishing rod fixing hollow column, formed on a second opening side of the hollow short cylindrical body and having threads formed inside, for screwing a fixing screw, wherein an end of the fixing screw presses against the grip of the fishing rod so that the fishing rod and the hollow short cylindrical body are tightly combined; and two connecting circular hollow columns, formed on a top side between the first opening side and the second opening side; a fishing rod bracket extension portion, comprising: a connecting structure, having two round holes formed on a top side of the connecting structure, for inserting the two connecting circular hollow columns, wherein a circular arc slot is formed on a lower side of the connecting structure, and a radius of the circular arc slot is substantially close to that of an outermost part of the hollow short cylindrical body so that the fishing rod bracket extension portion is able to ride on the hollow short cylindrical body with the circular arc slot; two extension sections, formed on the connecting structure and extended to the left and right; two connecting hollow columns, wherein each connecting hollow column is formed on an end of one extension section, respectively, for inserting a fixing rod of a fishing rod bracket; and a base portion, comprising: a rod base; a second pin connecting structure, formed on a top side of the rod base, for pin connecting the first pin connecting structure; two vertical fixing rod connecting hollow columns, formed on a first end of the rod base, wherein each vertical fixing rod connecting hollow column is used to insert a fixed rod fixed to the ground, respectively; and an adjusting screw allocating structure, having threads formed inside, formed on a second end of the rod base, for allocating an adjusting screw, wherein after the adjusting screw is screwed into the adjusting screw allocating structure, a head of the adjusting screw presses against a lower side of the second opening side of the hollow short cylindrical body, rotating to adjust an angle between the hollow short cylindrical body and the rod base.

According to the present invention, the fishing rod fixing portion may further comprise a combining hollow column, formed on a top side of the first opening side, for inserting a positioning pin.

According to the present invention, an opening having internal threads may be further formed on one side of the combining hollow column, for screwing a screw, so that the combining hollow column and the positioning pin are tightly combined by the screw.

According to the present invention, an opening having internal threads may be further formed on one side of the connecting hollow column, for screwing a screw, so that the connecting hollow column and the fixing rod of the fishing rod bracket are tightly combined by the screw.

According to the present invention, a horizontal fixed rod connecting hollow column may be further fixed on an end of the rod base, for inserting a fixed rod not fixed to the ground.

According to the present invention, an opening having internal threads may be further formed on one side of the horizontal fixed rod connecting hollow column, for screwing a screw, so that the horizontal fixed rod connecting hollow column and the fixed rod are tightly combined by the screw.

According to the present invention, a transverse fixed rod connecting hollow column may be further combined to the rod base top side, for inserting fishing peripheral devices having a fixing pin.

According to the present invention, two openings having internal threads may be further formed on two sides of the transverse fixed rod connecting hollow column, each opening for screwing a screw, so that the transverse fixed rod connecting hollow column and the fixing pin of the fishing peripheral devices are tightly combined by the screw.

According to the present invention, a transverse hanging rod may be further combined to a top side of the rod base.

According to the present invention, the fishing rod holder may further comprise a connecting pin, for pin connecting the first pin connecting structure and the second pin connecting structure.

The fishing rod holder according to the present invention has many hollow column designs for connection. It is very extensible and can be integrated with other auxiliary equipment to provide more customized combination of fishermen. In addition, the components of the fishing rod holder are detachable and can be assembled and used. It is a design that is not available in many homogenous products.

DETAILED DESCRIPTION OF THE PREFERRED EMBODIMENTS

The technical solutions in the embodiments of the present invention will be clearly and completely described below in conjunction with the drawings in the embodiments of the present invention. Obviously, the described embodiments are only a part of the embodiments of the present invention, and not all of the embodiments. All other embodiments obtained by those skilled in the art based on the embodiments of the present invention without creative efforts are within the scope of the present invention.

Figure 1:
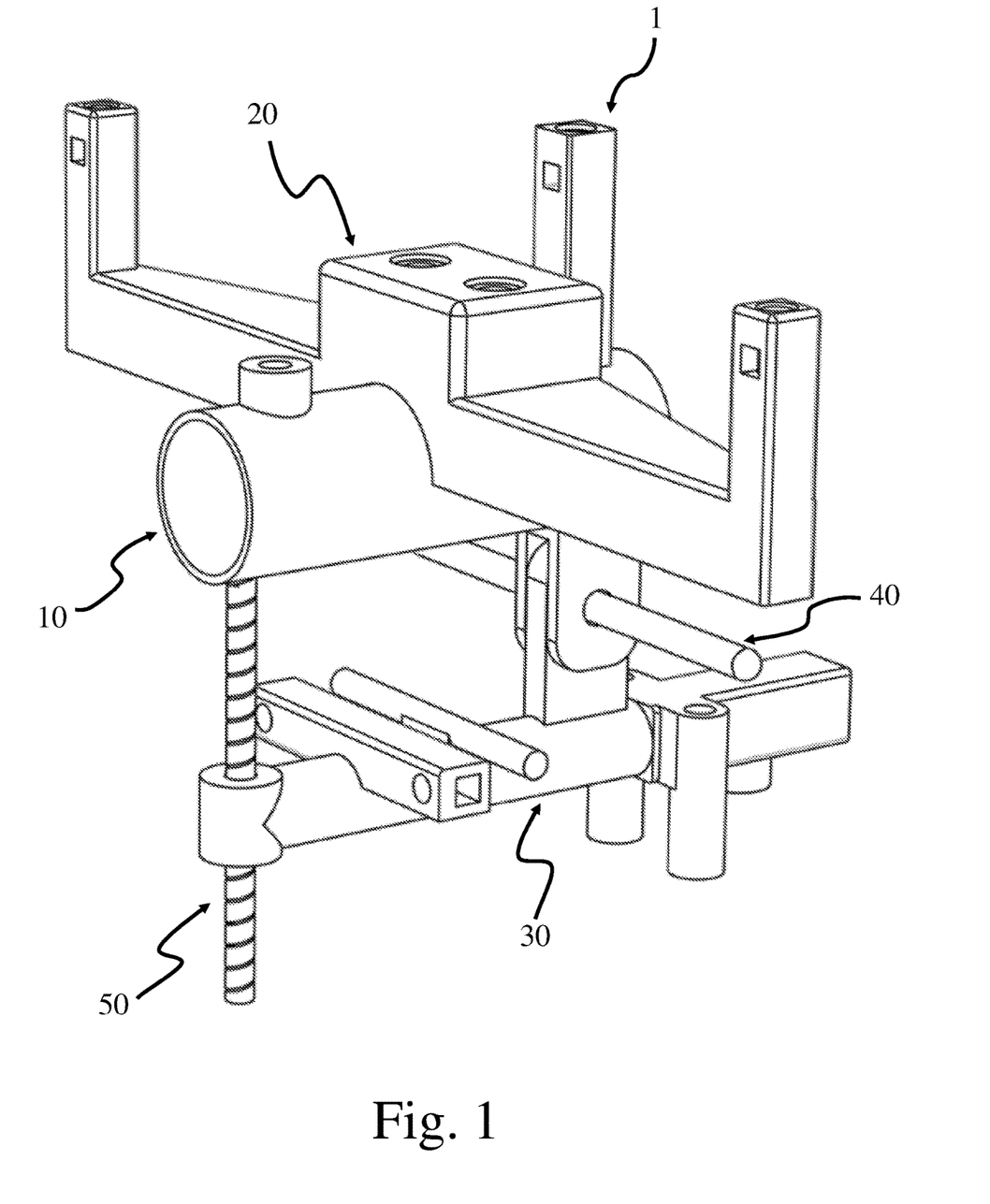
FIG. 1 is a schematic view of the appearance of an embodiment of a proposed fishing rod holder according to the present invention.
Figure 2:
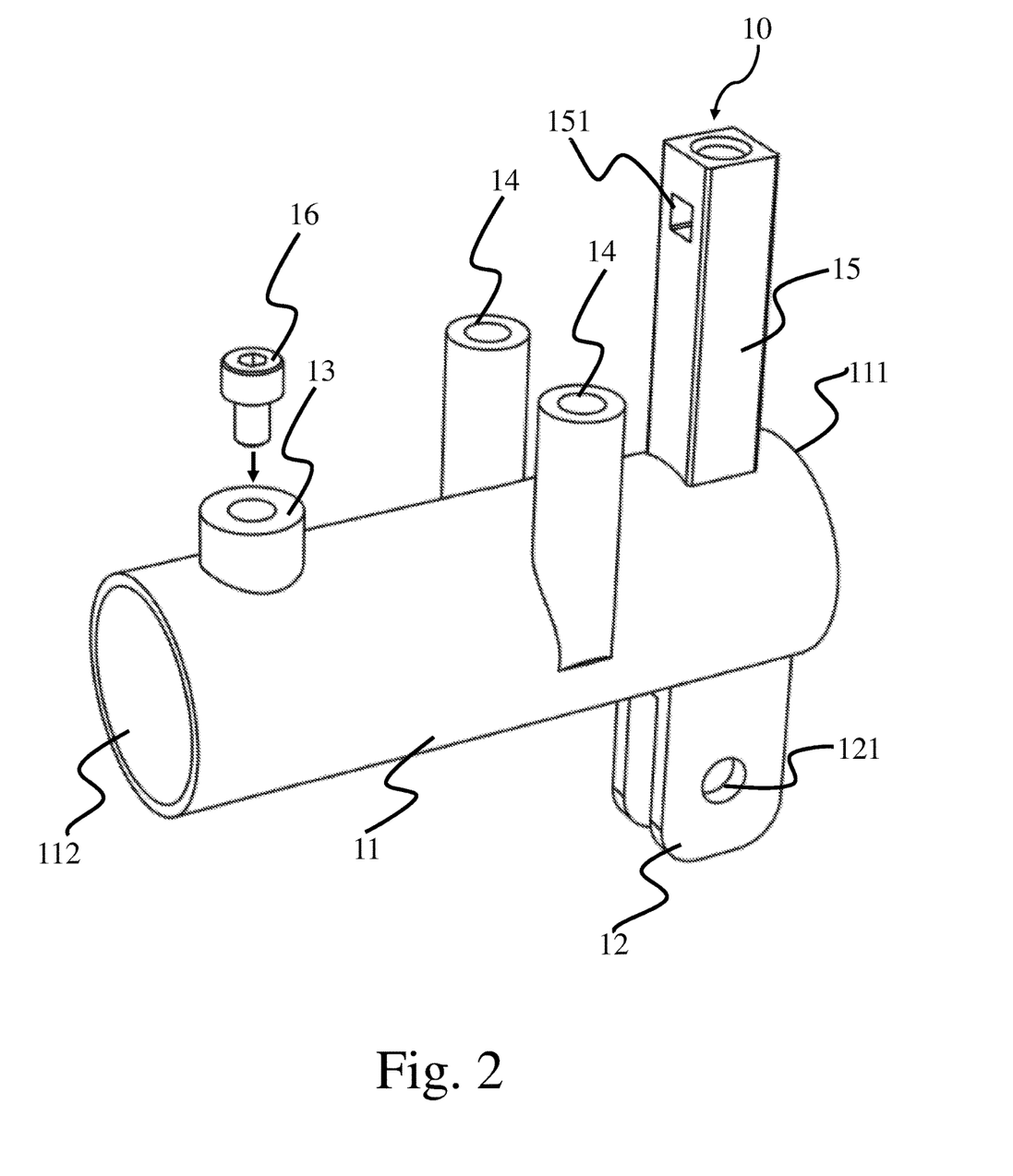
FIG. 2 is a schematic view of the appearance of a fishing rod fixing portion of the fishing rod holder.
Figure 3:
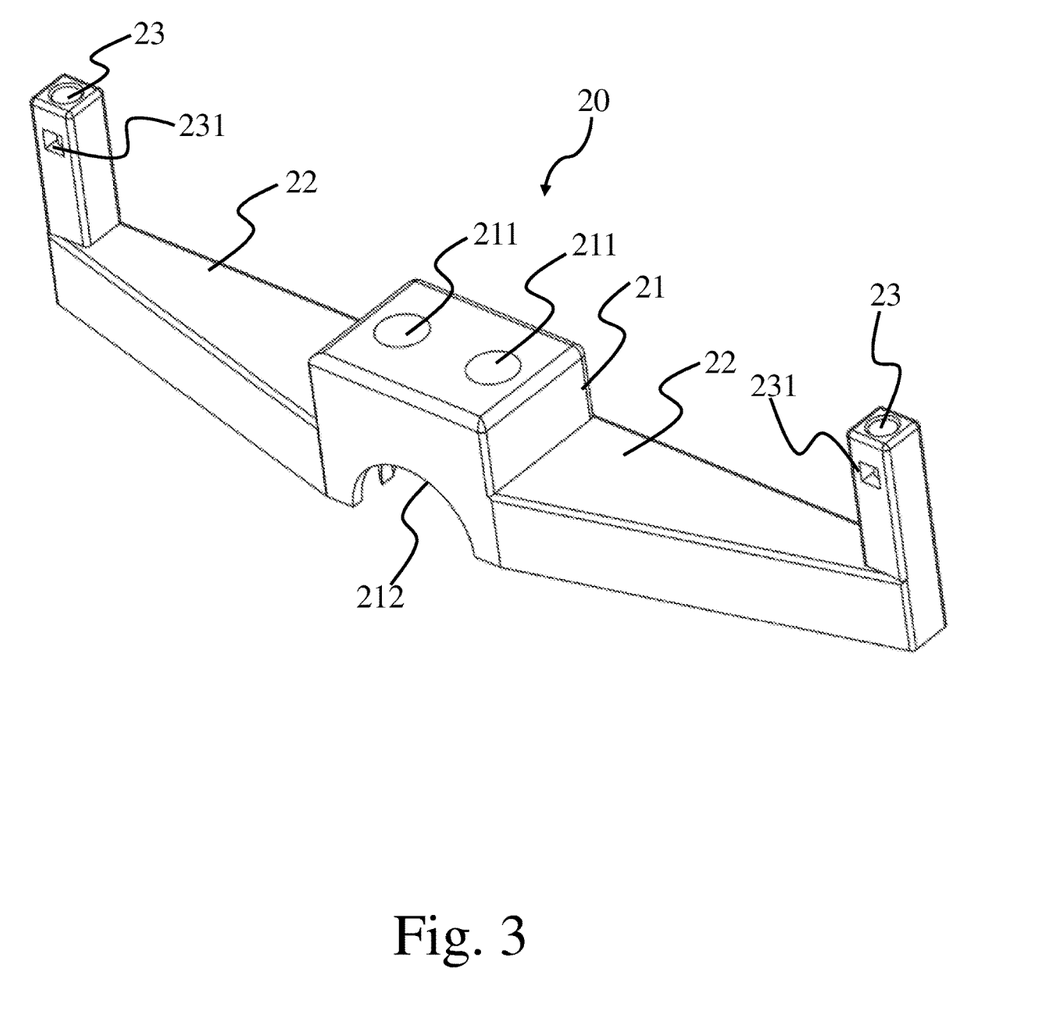
FIG. 3 is a schematic view of the appearance of a fishing rod bracket extension portion of the fishing rod holder.
Figure 4:
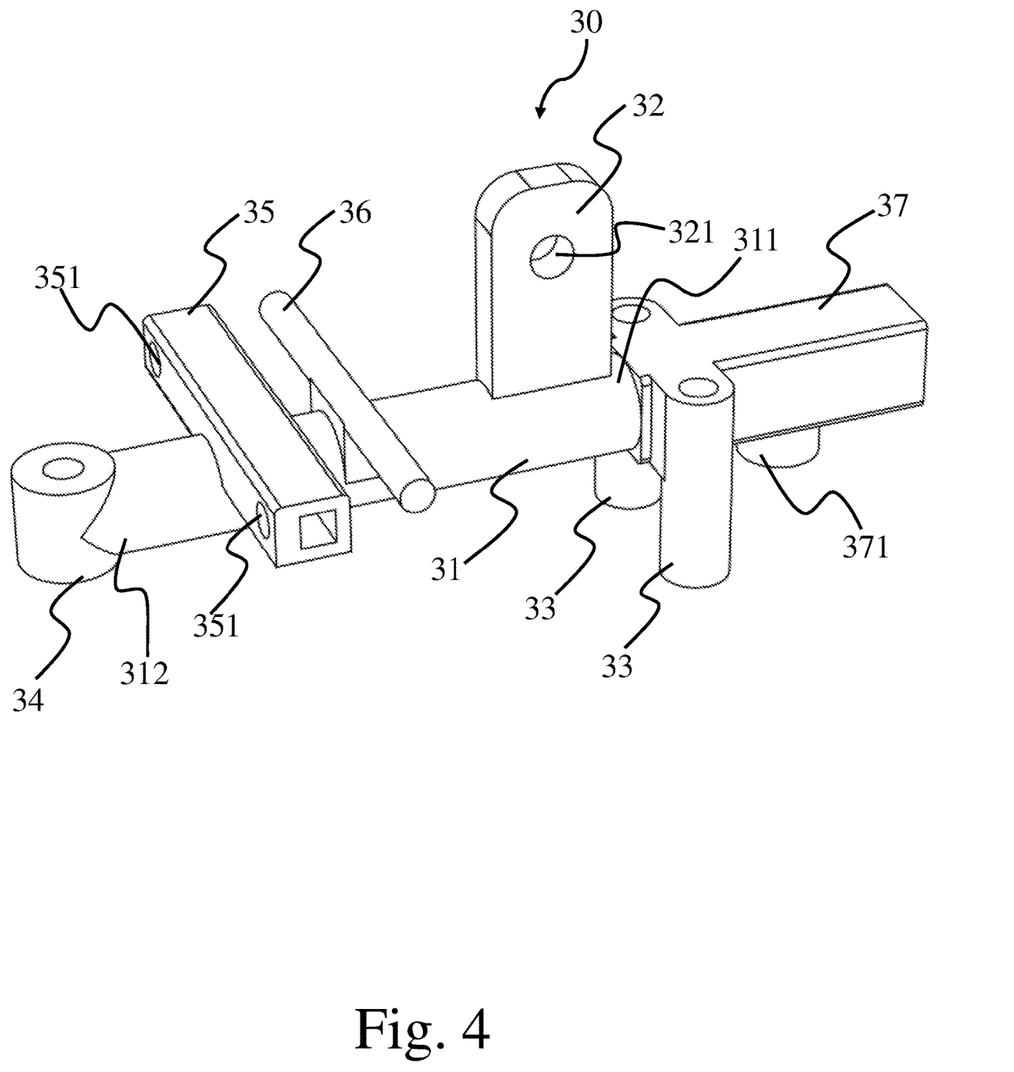
FIG. 4 is a schematic view of the appearance of a base portion of the fishing rod holder.
Figure 5:
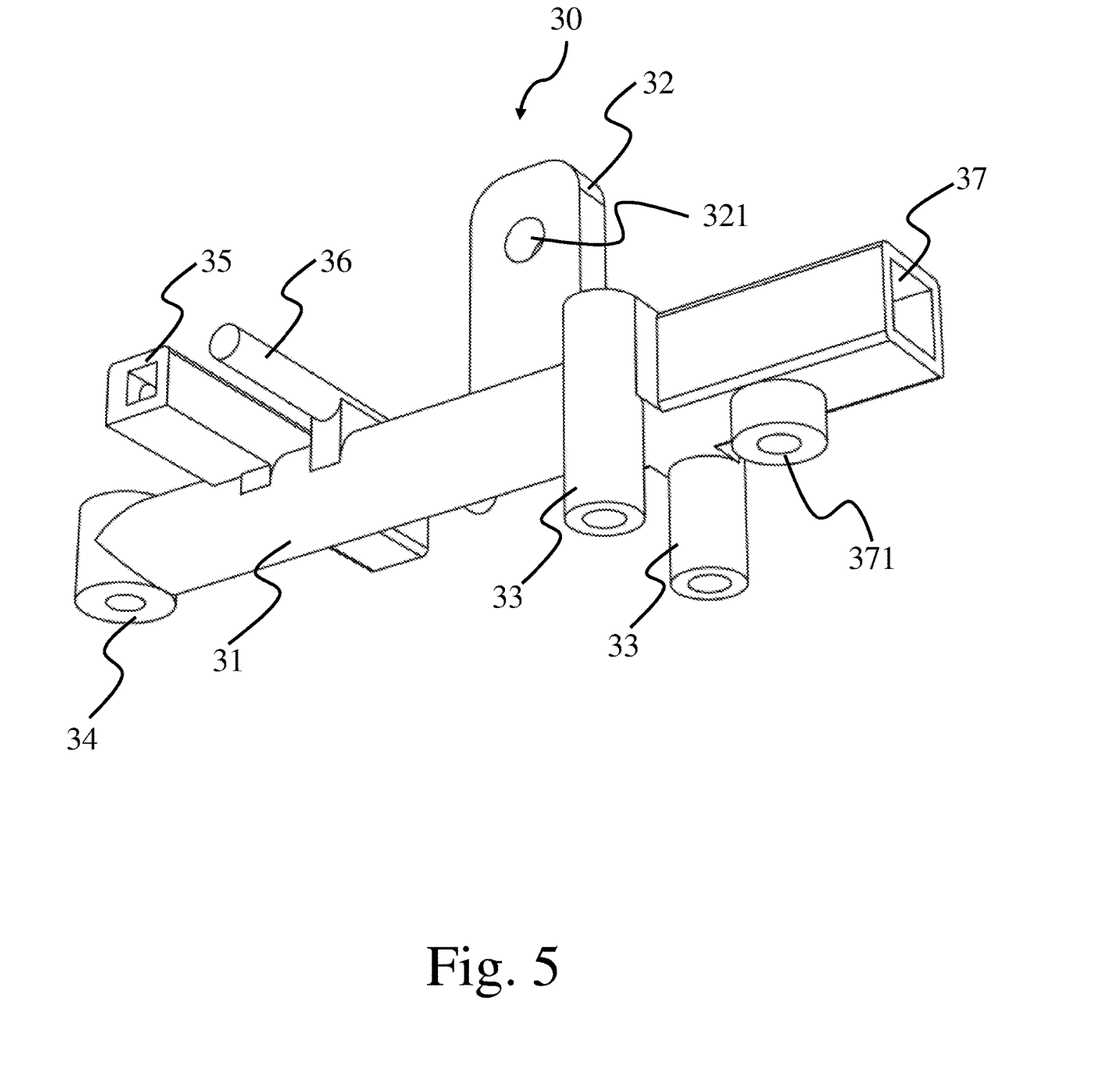
FIG. 5 is another schematic view of the appearance of the base portion.

Please refer to FIG. 1. It is a schematic view of the appearance of an embodiment of a proposed fishing rod holder 1 according to the present invention. Said fishing rod holder 1 comprises a fishing rod fixing portion 10, a fishing rod bracket extension portion 20, a base portion 30, a connecting pin 40 and an adjusting screw 50. Detailed structures of the fishing rod fixing portion 10 are shown in FIG. 2. Detailed structures of the fishing rod bracket extension portion 20 are shown in FIG. 3. Detailed structures of the base portion 30 are shown in FIG. 4 and FIG. 5.

The fishing rod fixing portion 10 includes a hollow short cylindrical body 11, a first pin connecting structure 12, a fishing rod fixing hollow column 13, two connecting circular hollow columns 14 and a combining hollow column 15. The interior of the hollow short cylindrical body 11 is for inserting a grip of a fishing rod. Due to the different specifications of the fishing rods, the grip has different designs. However, considering how the fisherman holds the grip, the cross-sectional shape of the grip is usually a round or regular polygon. Because the section inside the hollow short cylindrical body 11 is round, it is compatible with different fishing rods as long as the hollow short cylindrical body 11 has a large diameter. If the grip of the fishing rod is too small and easy to loose, it is able to use the fishing rod fixing hollow column 13 to assist in fixing. The fishing rod fixing hollow column 13 is formed on a second opening side 112 of the hollow short cylindrical body 11 and has threads formed inside, for screwing a fixing screw 16. an end of the fixing screw 16 presses against the grip of the fishing rod so that the fishing rod and the hollow short cylindrical body 11 are tightly combined. The first pin connecting structure 12 is formed below a first opening side 111 of the hollow short cylindrical body 11. It is a design used for pin connecting with the base portion 30. In practice, the first pin connecting structure 12 may be a Y-type pin connecting rod. Two connecting circular hollow columns 14 are formed on a top side between the first opening side 111 and the second opening side 112, for connecting the fishing rod bracket extension portion 20. The combining hollow column 15 is formed on a top side of the first opening side 111, for inserting a positioning pin. The positioning pin is a device used by many fishing peripherals to plug in with other fishing peripherals. The simplest type is to use a wire or metal rod as the positioning pin. Since the positioning pin may slide in the combined hollow column 15 due to external force, an opening 151 having internal threads is further formed on one side of the combining hollow column 15, for screwing a screw (not shown), so that the combining hollow column 15 and the positioning pin are tightly combined by the screw.

The fishing rod bracket extension portion 20 includes a connecting structure 21, two extension sections 22 and two connecting hollow columns 23. Two round holes 211 are formed on a top side of the connecting structure 21, for inserting the two connecting circular hollow columns 14 of the fishing rod fixing portion 10. A circular arc slot 212 is formed on a lower side of the connecting structure 21. A radius of the circular arc slot 212 is substantially close to that of an outermost part of the hollow short cylindrical body 11 so that the fishing rod bracket extension portion 20 is able to ride on the hollow short cylindrical body 11 with the circular arc slot 212 (as shown in FIG. 1). Two extension sections 22 are formed on the connecting structure 21 and extended to the left and right.

Figure 6:
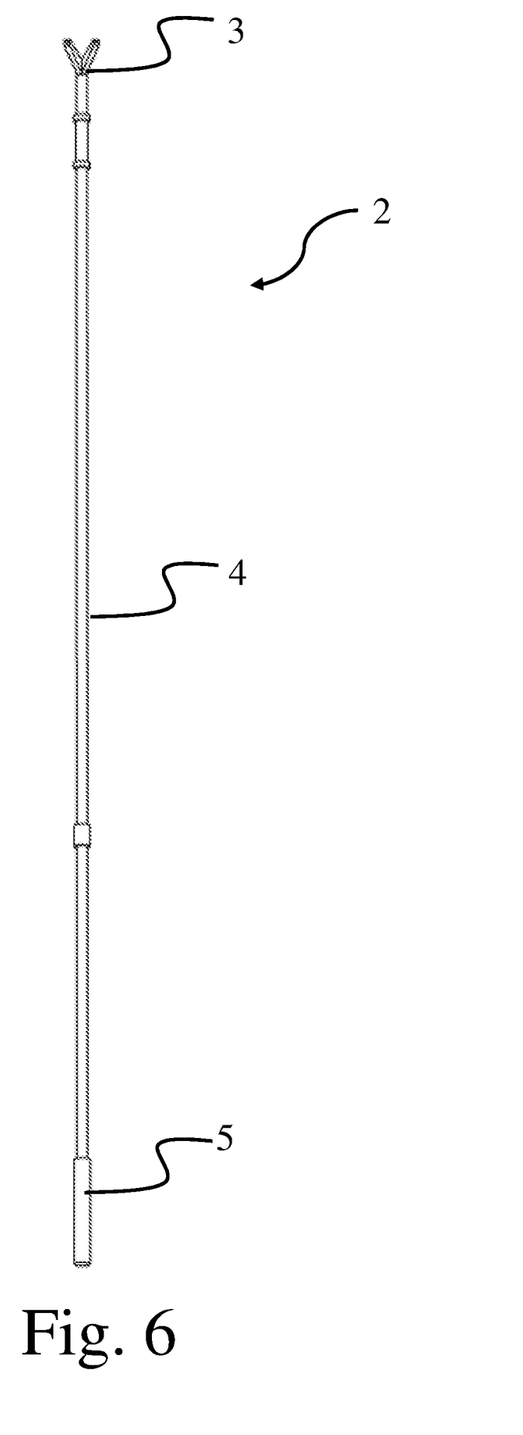
FIG. 6 is a schematic view of the appearance of a fishing rod bracket.

In the present embodiment, the section of each extension section 22 is changed from the maximum sectional area near the connecting structure 21 to the minimum sectional area at the end. Each of the two connecting hollow columns 23 is formed on a top side of an end of one extension section, respectively, for inserting a fixing rod of a fishing rod bracket. About the appearance and function of the fishing rod bracket, please refer to FIG. 6 along with the description. The main structure of the fishing rod bracket 2 are at least one Y-type fishing rod placer 3, a rod body 4 connecting the Y-type fishing rod placer 3, and a fixing rod 5 on the end. After the fixing rod 5 (in the present embodiment, the fixing rod 5 preferably maintains an angle of curvature with the rod body 4) is inserted into the connecting hollow column 23, other fishing rods used for fishing can temporarily lean on the Y-type fishing rod placer 3 with their grips placed on the ground. Thus, the number of fishing rods that can be temporarily placed on the fishing rod holder 1 can be more than 3. It's very convenient for a fisherman who is used to operating several fishing rods at the same time. It should be noticed that the fishing rod bracket 2 is a conventional article and does not belong to the creation content of the present invention. Similarly, an opening 231 having internal threads is further formed on one side of the connecting hollow column 23, for screwing a screw (not shown), so that the connecting hollow column 23 and the fixing rod of the fishing rod bracket are tightly combined by the screw.

The base portion 30 includes a rod base 31, a second pin connecting structure 32, two vertical fixing rod connecting hollow columns 33, an adjusting screw allocating structure 34, a transverse fixed rod connecting hollow columns 35, a transverse hanging rod 36 and a horizontal fixed rod connecting hollow column 37. The rod base 31 is the main body of the base portion 30. In the present embodiment, it is a hollow round rod; in practice, it can also be a solid round rod. The second pin connecting structure 32 is formed on a top side of the rod base 31, for pin connecting the first pin connecting structure 12. It can be seen form FIG. 4 that the second pin connecting structure 32 is formed by forming a round hole 321 on a plate. The connecting pin 40 passes through the round hole 321 and the round holes 121 of the first pin connecting structure 12, pin connecting the first pin connecting structure 12 and the second pin connecting structure 32. The two vertical fixing rod connecting hollow columns 33 are formed on a first end 311 of the rod base 31. Each vertical fixing rod connecting hollow column 33 is used to insert a fixed rod (not shown) fixed to the ground, respectively. Therefore, all external forces applied to the fishing rod holder 1 are finally transmitted to the ground through the two fixed rods. The adjusting screw allocating structure 34 has threads formed inside and is formed on a second end 312 of the rod base 31, for allocating the adjusting screw 50. After the adjusting screw 50 is screwed into the adjusting screw allocating structure 34, a head of the adjusting screw 50 presses against a lower side of the second opening side 112 of the hollow short cylindrical body 10, rotating to adjust an angle between the hollow short cylindrical body 10 and the rod base 31. The transverse fixed rod connecting hollow column 35 can be used to insert fishing peripheral devices which have a fixing pin. Two openings 351 having internal threads are further formed on two sides of the transverse fixed rod connecting hollow column 35 with each opening 351 for screwing a screw (not shown), so that the transverse fixed rod connecting hollow column 35 and the fixing pins of the fishing peripheral devices are tightly combined by the screw. The transverse hanging rod 36 and the transverse fixed rod connecting hollow column 35 are side by side and the transverse hanging rod 36 can be used to hang objects. The horizontal fixed rod connecting hollow column 37 is used for inserting a fixed rod not fixed to the ground. For example, the fixed rod is indirectly fixed to a carrying ice bucket while the Fishman is sitting on the carrying ice bucket with its weight supporting the fishing rod holder 1. Similarly, an opening 371 having internal threads is further formed on one side of the horizontal fixed rod connecting hollow column 37, for screwing a screw, so that the horizontal fixed rod connecting hollow column 37 and the fixed rod are tightly combined by the screw.

In terms of materials, the various components listed above can be made of wrought iron, stainless steel, plastic steel or carbon fiber materials, which are required for durability.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A fishing rod holder, comprising:
    a fishing rod fixing portion, comprising:
        a hollow short cylindrical body, the interior of the hollow short cylindrical body is for inserting a grip of a fishing rod;
        a first pin connecting structure, formed below a first opening side of the hollow short cylindrical body;
        a fishing rod fixing hollow column, formed on a second opening side of the hollow short cylindrical body and having threads formed inside, for screwing a fixing screw, wherein an end of the fixing screw presses against the grip of the fishing rod so that the fishing rod and the hollow short cylindrical body are tightly combined; and
        two connecting circular hollow columns, formed on a top side between the first opening side and the second opening side;
    a fishing rod bracket extension portion, comprising:
        a connecting structure, having two round holes formed on a top side of the connecting structure, for inserting the two connecting circular hollow columns, wherein a circular arc slot is formed on a lower side of the connecting structure, and a radius of the circular arc slot is substantially close to that of an outermost part of the hollow short cylindrical body so that the fishing rod bracket extension portion is able to ride on the hollow short cylindrical body with the circular arc slot;
        two extension sections, formed on the connecting structure and extended to the left and right;
        two connecting hollow columns, wherein each connecting hollow column is formed on an end of one extension section, respectively, for inserting a fixing rod of a fishing rod bracket; and
    a base portion, comprising:
        a rod base;
        a second pin connecting structure, formed on a top side of the rod base, for pin connecting the first pin connecting structure;
        two vertical fixing rod connecting hollow columns, formed on a first end of the rod base, wherein each vertical fixing rod connecting hollow column is used to insert a fixed rod fixed to the ground, respectively; and
        an adjusting screw allocating structure, having threads formed inside, formed on a second end of the rod base, for allocating an adjusting screw, wherein after the adjusting screw is screwed into the adjusting screw allocating structure, a head of the adjusting screw presses against a lower side of the second opening side of the hollow short cylindrical body, rotating to adjust an angle between the hollow short cylindrical body and the rod base.

2. The fishing rod holder according to claim 1, wherein the fishing rod fixing portion further comprises a combining hollow column, formed on a top side of the first opening side, for inserting a positioning pin.

3. The fishing rod holder according to claim 2, wherein an opening having internal threads is further formed on one side of the combining hollow column, for screwing a screw, so that the combining hollow column and the positioning pin are tightly combined by the screw.

4. The fishing rod holder according to claim 1, wherein an opening having internal threads is further formed on one side of the connecting hollow column, for screwing a screw, so that the connecting hollow column and the fixing rod of the fishing rod bracket are tightly combined by the screw.

5. The fishing rod holder according to claim 1, wherein a horizontal fixed rod connecting hollow column is further fixed on an end of the rod base, for inserting a fixed rod not fixed to the ground.

6. The fishing rod holder according to claim 5, wherein an opening having internal threads is further formed on one side of the horizontal fixed rod connecting hollow column, for screwing a screw, so that the horizontal fixed rod connecting hollow column and the fixed rod are tightly combined by the screw.

7. The fishing rod holder according to claim 1, wherein a transverse fixed rod connecting hollow column is further combined to the rod base top side, for inserting fishing peripheral devices having a fixing pin.

8. The fishing rod holder according to claim 7, wherein two openings having internal threads are further formed on two sides of the transverse fixed rod connecting hollow column, each opening for screwing a screw, so that the transverse fixed rod connecting hollow column and the fixing pin of the fishing peripheral devices are tightly combined by the screw.

9. The fishing rod holder according to claim 1, wherein a transverse hanging rod is further combined to a top side of the rod base.

10. The fishing rod holder according to claim 1, further comprising a connecting pin, for pin connecting the first pin connecting structure and the second pin connecting structure.

* * * * *